US011362340B2

(12) United States Patent
Dresp et al.

(10) Patent No.: US 11,362,340 B2
(45) Date of Patent: Jun. 14, 2022

(54) CATALYST MATERIAL FOR A FUEL CELL OR AN ELECTROLYSER AND ASSOCIATED PRODUCTION METHOD

(71) Applicant: TECHNISCHE UNIVERSITÄT BERLIN, Berlin (DE)

(72) Inventors: Sören Dresp, Berlin (DE); Malte Klingenhof, Berlin (DE); Peter Strasser, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 71 days.

(21) Appl. No.: 17/040,942

(22) PCT Filed: Apr. 11, 2019

(86) PCT No.: PCT/EP2019/059197
§ 371 (c)(1),
(2) Date: Sep. 23, 2020

(87) PCT Pub. No.: WO2019/197513
PCT Pub. Date: Oct. 17, 2019

(65) Prior Publication Data
US 2021/0028465 A1  Jan. 28, 2021

(30) Foreign Application Priority Data

Apr. 13, 2018 (EP) .................................. 18167304

(51) Int. Cl.
*H01M 4/02* (2006.01)
*H01M 4/86* (2006.01)
(Continued)

(52) U.S. Cl.
CPC ............. *H01M 4/8652* (2013.01); *C25B 9/23* (2021.01); *C25B 11/091* (2021.01);
(Continued)

(58) Field of Classification Search
CPC ....................................................... H01M 4/02
See application file for complete search history.

(56) References Cited

FOREIGN PATENT DOCUMENTS

| EP | 3 125 358 A1 | 2/2017 |
| EP | 3 168 925 A1 | 5/2017 |

(Continued)

OTHER PUBLICATIONS

"Towards core-shell bifunctional catalyst particles for aqueous metal-air batteries: NiFe-layered double hydroxide nanoparticle coatings on γ-MnO2 microparticles" Fiegler et al. Electrochimica Acta vol. 231, Mar. 2017, pp. 216-222.*

(Continued)

*Primary Examiner* — Jacob B Marks
(74) *Attorney, Agent, or Firm* — Lewis Roca Rothgerber Christie LLP

(57) ABSTRACT

The invention relates to a multi-component catalyst material for use in a fuel cell or electrolysis system, in particular in a regenerative fuel cell or reversible electrolyser.
According to the invention, the catalyst material comprises a doped manganese oxide, a NiFe intercalation compound and a conductive carrier material, wherein the doped manganese oxide and the NiFe intercalation compound are supported on the carrier material.

15 Claims, 5 Drawing Sheets

(51) Int. Cl.
C25B 9/23 (2021.01)
C25B 11/091 (2021.01)
H01M 4/90 (2006.01)

(52) U.S. Cl.
CPC ....... *H01M 4/9016* (2013.01); *H01M 4/9041* (2013.01); *H01M 4/9083* (2013.01)

(56) References Cited

FOREIGN PATENT DOCUMENTS

| | | | |
|---|---|---|---|
| JP | 2005-174621 A | 6/2005 | |
| JP | 2008-276985 A | 11/2008 | |
| JP | 2011-150893 A | 8/2011 | |
| JP | 2013-201056 A | 10/2013 | |
| WO | WO 2015/146671 A1 | 10/2015 | |
| WO | WO 2016/006292 A1 | 1/2016 | |

OTHER PUBLICATIONS

Huang Jingwei et al, "Mn-doping and NiFe layered double hydroxide coating: Effective approaches to enhancing the performance of [alpha]-Fe2O3 in photoelectrochemical water oxidation", Journal of Catalysis, Academic Press, Duluth, MN, US, vol. 340, Jun. 21, 2016, p. 261-269, XP029649037.

Flegler Andreas et al, "Towards core-shell bifunctional catalyst particles for aqueous metal-air batteries: NiFe-layered double hydroxide nanoparticle coatings on [gamma]-MnO2 microparticles", Electrochimica Acta, Elsevier Science Publishers, Barking, GB, vol. 231, Feb. 4, 2017, p. 216-222, XP085134156.

Ning Fanyu et al, "TiO 2 /graphene/NIFe-layered double hydroxide nanorod array photoanodes for efficient photoelectrochemical water splitting", vol. 9, No. 8, Jan. 1, 2016, p. 2633-2643, Energy & Environmental Science, RSC Publ, Cambridge, Retrieved from the Internet: URL:http://xlink.rsc.org/?DOI=C6EE01092J, XP009507735.

Davis, Danae J., et al., "Role of Cu-Ion Doping in Cu—α—MnO$_2$ Nanowire Electrocatalysts for the Oxygen Reduction Reaction," The Journal of Physical Chemistry C 118.31 (2014): 17342-17350.

Lehtimaki, et al., Targeted design of α-MnO$_2$ based catalysts for oxygen reduction, Electrochmica Acta, 191, 2016, pp. 452-461.

Zhao, Anqi et al. "Activation and Stabilization of Nitrogen-Doped Carbon Nanotubes as Electrocatalysts in the Oxygen Reduction Reaction at Strongly Alkaline Conditions," Journal of Physical Chemistry, C 2013, 117, 46, pp. 24283-24291.

Vikkisk, Merilin et al., "Electrocatalytic oxygen reduction on nitrogen-doped graphene in alkaline media", *Applied Catalysis B. Environmental*, 147 (2014) :369-376.

Dresp, Sören et al., "An efficient bifunctional two-component catalyst for oxygen reduction and oxygen evolution in reversible fuel cells, electrolyzers and rechargeable air electrodes", *Energy Environ. Sci.*, 2016, 9, 2020-2024.

Office action, with English translation, dated Jan. 5, 2022, for corresponding Japanese Patent Application No. 2020-554881 (11 pages).

* cited by examiner

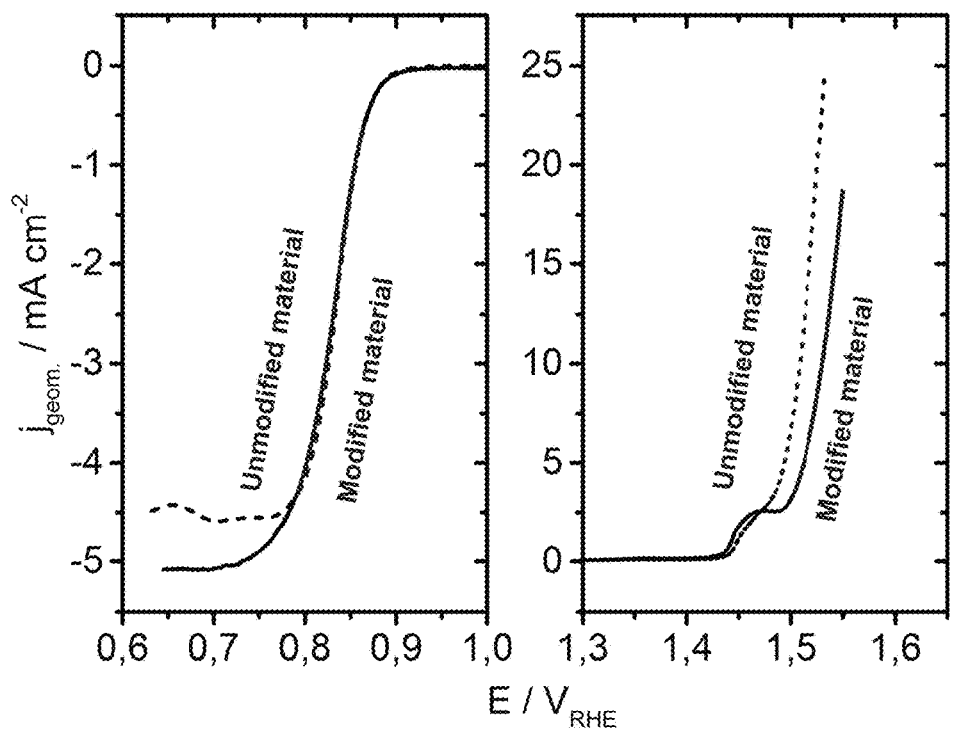
FIG. 7a  FIG. 7b
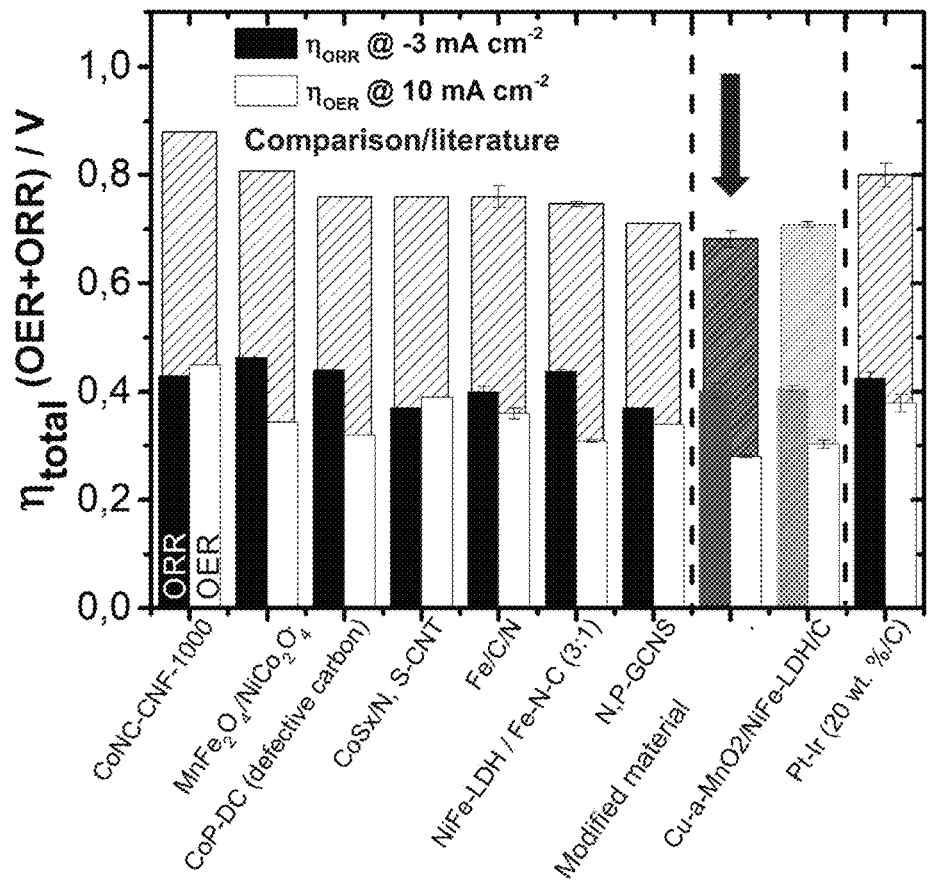
FIG. 8

CATALYST MATERIAL FOR A FUEL CELL OR AN ELECTROLYSER AND ASSOCIATED PRODUCTION METHOD

CROSS-REFERENCE TO RELATED APPLICATION(S)

This application is a U.S. National Phase Patent Application and claims priority to and the benefit of International Application Number PCT/EP2019/059197, filed on Apr. 11, 2019, which claims priority to European Patent Application Number 18167304.7, filed on Apr. 13, 2018, the entire contents of all which are incorporated herein by reference.

The invention relates to a catalyst material for use as an electrode, in particular in a regenerative fuel cell or a reversible electrolysis cell, and to a method for producing the catalyst material.

The demand for clean and renewable energy storage and energy conversion systems for mobile and stationary applications is increasing rapidly. A unitised regenerative fuel cell (URFC), a hybrid of electrolyser and fuel cell, offers the possibility of storing energy from renewable energy sources (solar/wind power plants) in the form of molecular hydrogen from the electrochemical splitting of water and converting said energy into electrical energy when required. Water is the only by-product of this process. This offers the possibility of storing excess energy produced in an environmentally friendly manner and providing it on demand. This process can significantly reduce the emission of greenhouse gases (GHG) and thus significantly contribute to the energy transition. However, the performance of electrolyser systems, fuel cells or unitised regenerative fuel cells depends greatly on the speed (kinetics) of the electrochemical reactions that take place. These reactions are firstly the oxygen-converting processes (oxygen processes), specifically the oxygen evolution reaction (OER) and the oxygen reduction reaction (ORR), and the hydrogen-converting processes (hydrogen processes) at the hydrogen electrode, specifically the hydrogen oxidation reaction (HOR) and the hydrogen evolution reaction (HER). Since the hydrogen reactions are comparatively simple two-stage reactions, the overall processes are limited by the comparatively poor kinetics of the four-stage electrochemical oxygen reactions.

Due to the complexity of said oxygen processes, there is a need for a catalytic system which can catalyse OER and ORR efficiently with as little loss as possible over long periods of time in order to provide a competitive alternative to well-established energy carriers.

The best OER and ORR catalysts under acidic conditions are based on precious metals and their oxides. While iridium- and ruthenium-based materials are most often used in acidic membrane-based electrolyser systems (proton exchange membrane water electrolyser, PEMWE), platinum alloys are the best catalysts for fuel cell applications in acidic environments. The disadvantage of these materials is their small reserves together with their high costs, thereby precluding wider use. Catalysts based exclusively on abundant transition metal oxides or functionalised carbons offer promising alternatives for future purposes. Therefore, the characterisation of transition metal catalysts for OER and ORR is an important and current focus of research.

It has been found that primarily intercalation compounds consisting of nickel and iron are particularly efficient OER catalysts. NiFe compounds in the form of so-called layered double hydroxides (LDH) are particularly noteworthy. Dresp et al. (S. Dresp, F. Luo, R. Schmack, S. Kühl, M. Gliech and P. Strasser, *Energy Environ. Sc.*, 2016, 9, 2020-2024) have shown that NiFe LDH is suitable as an OER-active component in a bifunctional two-component catalyst system. Unfortunately, said system showed huge losses in activity during electrochemical stress tests, which are attributable to the degradation of the ORR-active carbon-based species caused by the high OER potentials. The activity of the OER-active component was thus not restricted. In addition to NiFe LDH, a second sufficiently stable ORR-active component is required for a bifunctional catalyst for use in a regenerative fuel cell since NiFe LDH does not have sufficient ORR activity.

Manganese oxides, particularly perovskites ($Mn_2O_3$) and cryptomelane-type oxides ($MnO_2$) have ORR activities in alkaline media comparable to commercial Pt/C. The disadvantages of these oxides result from the size of the materials with a low surface area and poor electrical conductivity. These disadvantages require modifications to the metal oxide and the use of a suitable conductive carrier material having a large surface area. The most common carrier materials are carbon blacks such as Vulcan XC-72 R, graphene or carbon nanotubes (CNT). However, such carrier materials, in light of their carbon corrosion which can occur at OER-relevant potentials, lead to a significant destabilisation of the catalyst material. Therefore, such carbon-containing catalyst systems are limited in a bifunctional oxygen electrode system by low long-term stabilities.

The combination of a material specialised for the catalysis of ORR with a material specialised for the catalysis of OER leads to a new catalyst system which ideally has the advantageous catalytic properties of the respectively specialised materials. However, the disadvantages of the respective materials are generally also inherited. This makes it extremely difficult to find two materials which actively catalyse one of the reactions mentioned and have sufficient stability under the completely different conditions of the reverse reaction.

J. Huang et al. (*J. Catalysis* 340 (2016), pages 261-269) describe a catalyst material for photoelectrical water splitting (PEC) for hydrogen generation. The catalyst material contains manganese-doped $\alpha$-$Fe_2O_3$ which is coated with NiFe LDH (Mn:$\alpha$-$Fe_2O_3$/NiFe LDH) and is supported on FTO.

A. Flegler et al. (*Electrochim. Acta* 231 (2017), pages 216-222) describe a bifunctional catalyst material for metal-air batteries, comprising particles of $\gamma$-$MnO_2$ which are coated with NiFe LDH ($\gamma$-MnO2/NiFe LDH) and are present on a glassy carbon substrate.

The object of the present invention is to avoid the problems of the prior art. In particular, a catalyst material for an electrode in a fuel cell, an electrolyser or a metal-air battery is to be provided which catalyses both an oxygen-converting reaction and an oxygen-generating reaction. Furthermore, the electrode provided should have high long-term stability, in particular compared to conventional electrodes.

This object is achieved by a catalyst material for a regenerative fuel cell or a reversible electrolyser, an electrode or a regenerative fuel cell having such a catalyst material as well as a method for producing the catalyst material having the features of the independent claims.

A first aspect of the invention thus relates to a catalyst material for a regenerative fuel cell or for a reversible electrolyser, comprising a multi-component system having a manganese oxide doped with a dopant M; a NiFe intercalation compound; and a conductive carbon-containing carrier material on which the doped manganese oxide and the NiFe intercalation compound are directly or indirectly arranged (supported).

In this case, a direct arrangement is understood as meaning an arrangement with direct contact between the carrier material and the manganese oxide and/or the NiFe intercalation compound. On the other hand, an indirect arrangement denotes a situation in which the manganese oxide and/or the NiFe intercalation compound has no direct contact with the carrier material, but is separated by an intermediate component. In particular, the NiFe intercalation compound may be present between the carrier material and the manganese oxide, or manganese oxide may be present between the carrier material and the NiFe intercalation compound. Typically, mixtures of all of these configurations are to be expected. It is preferred that both the manganese oxide and the NiFe intercalation compound be present directly on the carrier material, i.e. in direct contact with said carrier material.

The present invention provides a bifunctional catalyst material which is capable of catalysing the oxygen reduction reaction (ORR) and the oxygen evolution reaction (OER) in unitised regenerative fuel cells (URFC), reversible electrolysers or metal-air batteries in the same way. In contrast to conventional catalyst materials for fuel cells and electrolysers, the material comprises two electrocatalysts, each of which selectively catalyses one of the oxygen reactions at an oxygen electrode. In other words, by means of the present combination of the two electrocatalysts, the oxidation of water and the reduction of oxygen are equally active. The additional carrier material improves overall conductivity and increases activity.

The doped manganese oxide selectively catalyses the reduction of oxygen (ORR), whereas the NiFe intercalation compound selectively catalyses the oxygen evolution reaction (OER). Surprisingly, the combination of the two specialised catalyst constituents does not significantly impair the respective selectivities and activities.

The bifunctional activity of the catalyst material according to the invention is remarkably good. In contrast to the conventional approach of maximising activity by enlarging the surface area (for example by using nanoparticles), the catalyst material according to the invention preferably has comparatively large particles and thus small surface areas. The manganese oxide is preferably present in the form of rhomboidal particles which have a length from 50 to 300 nm, in particular from 70 to 150 nm, in relation to their greatest extension from rhomboid tip to rhomboid tip. For example, the rhomboidal particles have an average particle size of 100×15×15 nm. The NiFe intercalation compound is preferably present in the form of small thin platelets having a diameter in the range from 10 to 500 nm, in particular from 20 to 250 nm. Conventional precious metal-based catalysts of the prior art have a diameter of 1 to 5 nm. Thus, both materials according to the invention have comparatively large dimensions. Moreover, NiFe intercalation compounds tend to reduce the active surface area by covering the reactive interface of the catalyst. Therefore, the simultaneously high ORR and OER activities are surprising. The stability of the catalyst material according to the invention is also surprising since it contains a carbon component. Due to the carbon corrosion mentioned, this leads in most cases to a dramatic deterioration in activity over prolonged periods of time, whereas the activity in the system according to the invention is maintained.

Therefore, it has been found that the catalyst material according to the invention has a surprisingly low level of degradation caused by catalyst corrosion, in particular a low tendency toward carbon corrosion in the carrier material. This leads to a significantly higher long-term stability of the catalyst material compared to known systems.

According to the invention, a manganese oxide doped with a dopant M is used as the doped transition metal oxide. Manganese oxide is particularly cost-effective as a base material and exhibits remarkable ORR activities, in particular as an α-manganese oxide, for example of the cryptomelane type. It is thus particularly preferable that the manganese oxide of formula M corresponds to M:α-$MnO_2$.

The dopant M is preferably selected from the group comprising iron, nickel, copper, silver and/or cobalt. This group of dopants has proved to be particularly suitable for increasing the activity of the catalyst material in oxygen reduction reactions.

In a further preferred embodiment of the invention, the dopant is present in a proportion by weight of between 0.1 and 3.5 wt %, in particular between 0.2 and 3.35 wt %, preferably from 0.3 to 2.5 wt %, particularly preferably 0.5 to 1.5 wt %, in relation to the undoped manganese oxide. Doping of the manganese oxide in these regions was found to be advantageous in particular for the above-mentioned group of possible dopants with respect to the activity and the stability of the doped manganese oxide while simultaneously maximising the selective catalysis of the oxygen reduction reaction.

Particularly advantageously, the NiFe intercalation compound is present as a so-called layered double hydroxide (LDH). NiFe LDH has a high level of activity in the catalysis of the oxygen evolution reaction and is furthermore characterised by its high selectivity and stability.

LDH are a class of ionic solids distinguished by a layer structure with the generic sequence $[AcBZAcB]_n$. In this case, c defines layers of metal cations, where A and B are layers of hydroxide (OH groups or $O^-$ anions) and Z is layers of other anions or neutral molecules (such as water). Lateral offsets between the layers may result in longer repetition periods. The intercalated anions (Z) are weakly bound and often exchangeable. In the present case, iron and nickel are divalent and trivalent cations which are arranged as a positive layer c between anionic or neutral hydroxide layers A, B. This is a hydrotalcite-type intercalation compound. Particularly preferably, nickel and iron are present in a molar ratio of 1.5:1 to 5:1, in particular 3:1 to 5:1, in the NiFe intercalation compound (in relation to the NiFe LDH before any anion exchange). The proportions indicated relate to molar fractions measured using ICP-OES. However, since the molar masses are very similar, the differences to parts by weight are small.

The NiFe intercalation compound, in particular in the form of NiFe LDH, is modified by anion exchange in a special embodiment of the invention. In particular, hydroxide ions or carbonate ions of the layers A, B can be exchanged for perchlorate ions or chloride ions. However, the introduction of other anions is also conceivable. The interlayer distance can be influenced in this way according to the radius of the incorporated anions. The NiFe intercalation compound resulting from the modification has higher electrocatalytic activities with respect to OER than the unmodified material. A suitable method for producing a chloride- or perchlorate-modified NiFe intercalation compound is described in Song et al. (Song, F., et al., Exfoliation of layered double hydroxides for enhanced oxygen evolution catalysis. *Nature Communications* 2014, 5 (1)). This is a two-stage anion exchange of the anions present in the intermediate layer A, B of the NiFe intercalation compound. For example, a NiFe intercalation compound obtained from the microwave-assisted synthesis is used as the starting material for the modification. The anion exchange comprises two steps. In the first step, the anions present in the intermediate layer A, B, which are mainly carbonate or hydroxide ions, are exchanged for chloride ions. In the second step, the chloride ions are exchanged for perchlorate ions.

According to one embodiment, the NiFe intercalation compound is grown directly on the carrier material. This makes it possible to increase the electrocatalytic activity of the NiFe intercalation compound with respect to the OER. For example, such a system can be produced by a microwave-assisted synthesis method, wherein the desired carrier material is added and dispersed in the reaction solution prior to the microwave process. A suitable production protocol is described in Dresp et al. (S Dresp, F Luo, R Palack, S Cooling, M Divided and P Strasser, Energy Environ. c., 2016, 9, 2020-2024).

In a further preferred embodiment of the invention, the conductive carrier material is selected from particulate carbon, so-called carbon black, graphene, nanostructured carbon, for example carbon nanotubes (CNT), multi-walled carbon nanotubes (MWCNT), carbon nanohorns or carbon nanofibres, carbonised carrier material or the like, and mixtures thereof. These materials have high electrical conductivities and adjustable surface sizes and are therefore particularly suitable as carrier materials for the transition metal oxide and/or the intercalation compound. In the catalyst material according to the invention, the carrier material is used in particular as a substrate for the manganese oxide, which thus accumulates on the surface of the carrier material. In this way, the disadvantages of most transition metal oxides, in particular of cryptomelanes, which are observed in terms of small dimensions and thus low surface area, are overcome. In addition, aggregation of the catalytically active substance as well as removal of the latter from the system are prevented.

In preferred exemplary embodiments, the conductive carrier material, in particular in the form of the above-mentioned examples, is modified by foreign atoms, with individual carbon atoms of the lattice being substituted by foreign atoms. Preferred foreign atoms include oxygen, nitrogen, phosphorus and combinations thereof. The modified carbon-containing carrier materials have better electrocatalytic activity with respect to OER and ORR and better stability in the relevant potential range of 0.6 V to 1.9 V, measured with respect to a reversible hydrogen electrode (RHE). Suitable modified carbon materials and the production of same are known (Inagaki, M., et al., Nitrogen-doped carbon materials. *Carbon* 2018, 132, 104-140; Khazaee, M., et al., Dispersibility of vapor phase oxygen and nitrogen functionalized multi-walled carbon nanotubes in various organic solvents. *Sci Rep* 2016, 6, 26208; Wepasnick, K. A., et al., Surface and structural characterization of multi-walled carbon nanotubes following different oxidative treatments. *Carbon* 2011, 49 (1), 24-36; Zhao, A., et al., Activation and Stabilization of Nitrogen-Doped Carbon Nanotubes as Electrocatalysts in the Oxygen Reduction Reaction at Strongly Alkaline Conditions. *The Journal of Physical Chemistry C* 2013, 117 (46), 24283-24291; Vikkisk, M., et al., Electrocatalytic oxygen reduction on nitrogen-doped graphene in alkaline media. *Applied Catalysis B: Environmental* 2014, 147, 369-376). A modification with oxygen is frequently carried out first in order to subsequently modify the resulting oxygen-modified carbon-containing carrier material (OC) with nitrogen and/or phosphorus.

Particularly advantageously, a weight ratio between the manganese oxide, the NiFe intercalation compound and the carrier material is in the range from 1:1:1 to 3:3:1. In this range, the comparatively small active surface area already described above, in particular a small free surface area of the carrier material, could be produced particularly well in the catalyst material according to the invention with the resulting unexpected advantages with respect to the long-term stability of the catalyst material when used in an electrode.

A further aspect of the invention relates to an electrode, in particular an oxygen electrode for a fuel cell, which has the catalyst material according to the invention. The invention further relates to a fuel cell comprising an ion exchange membrane which is coated at least on one side with the catalyst material according to the invention.

The invention further relates to a method for producing the catalyst material according to the invention. The method according to the invention comprises preparing a mixture of the doped manganese oxide, the NiFe intercalation compound and the conductive carrier material by physically mixing the starting materials in powder or particulate form, wherein the particles are preferably nanoparticles, i.e. have average particle sizes in the range from 1 to 100 nm. In order to prepare a catalyst ink, in the form of a catalyst dispersion, the mixture is suspended with the addition of (in particular high-purity) water, an organic solvent (preferably isopropanol) and optionally a binder. The suspension is preferably supported by sonication. The high-purity water has a resistance of at least 17 MΩ. Preferably 18.2 MΩ or more.

The obtained catalyst ink is then applied to a substrate by conventional methods. After the solvents have evaporated, the catalyst material according to the invention remains on the substrate with binder.

The binder used is preferably a perfluorinated sulfonic acid polymer, in particular Nafion®. Compared to other binders, these have the advantage that they have ionic properties and thus do not reduce the conductivity of the catalyst material. In addition, perfluorinated sulfonic acid polymers are characterised by high operating temperatures compared to other polymers.

The organic solvent is in particular a lower alcohol of 1 to 6 carbon atoms, preferably isopropanol.

In one embodiment, the NiFe intercalation compound is applied to the carbon-containing carrier material already during the synthesis, in particular by directly growing on the carrier material (see above). In this case, the first step of the method comprises preparing a mixture of the doped manganese oxide and the NiFe intercalation compound present on the carrier material.

In the case of slow processes for applying the catalyst ink to a substrate, the following ratios are preferred. Particularly advantageously, the suspension contains 70-80 wt % water, 15-35 wt % organic solvent (in particular isopropanol) and 0-5 wt %, in particular 2-5 wt %, binder in relation to the sum of the components water, organic solvent and binder. They are particularly preferably in a ratio of 76.8:20:3.2 wt %. The solvent ratios and ratios between catalyst and binder can be adjusted to a faster coating process as follows. Particularly advantageously, 0.5-5 wt % water and 95-99.5 wt % organic solvent are present in relation to the sum of the components water and organic solvent. The catalyst and binder are preferably added to said solvent mixture in a ratio of between 5:3 and 7:3. Within the above-mentioned proportion ranges, the catalyst inks provided have particularly uniform distribution and good suspension capability of the particles (transition metal oxide, intercalation compound, carrier material) as well as an optimum trade-off between rapid and gentle evaporation of the solvents. The present ratio between organic components and water has shown a high level of physical stability and adhesion of the catalyst material or the catalyst layer.

The substrate coated with the catalyst material according to the invention is preferably used as an electrode, in particular as an oxygen electrode, in a fuel cell, an electrolyser of a battery or a regenerative fuel cell or reversible electrolyser.

Further preferred embodiments of the invention arise from the other features mentioned in the dependent claims.

The various embodiments of the invention mentioned in this application can be advantageously combined with one another unless stated otherwise in a particular case.

The invention is explained below in exemplary embodiments with reference to the associated drawings. Therein:

FIG. 7 shows a) ORR activities and b) OER activities of a modified catalyst material Cu:α-MnO$_2$/mod. carbon/NiFe LDH (Cl$^-$/ClO$_4^-$) according to the invention compared with the unmodified material Cu:α-MnO$_2$/carbon/NiFe LDH;

FIG. 8 shows a comparison of the ORR and OER activities and the total activity of the modified catalyst material Cu:α-MnO$_2$/mod. carbon/NiFe LDH (Cl$^-$/ClO$_4^-$) and the unmodified material Cu:α-MnO$_2$/carbon/NiFe LDH compared with OER/OPR catalysts of the prior art; and FIG. 9 shows long-term stability of the a) modified catalyst material Cu:α-MnO$_2$/mod. carbon/NiFe LDH (Cl$^-$/ClO$_4^-$) b) compared with the unmodified material Cu:α-MnO$_2$/carbon/NiFe LDH.

Figure 1:
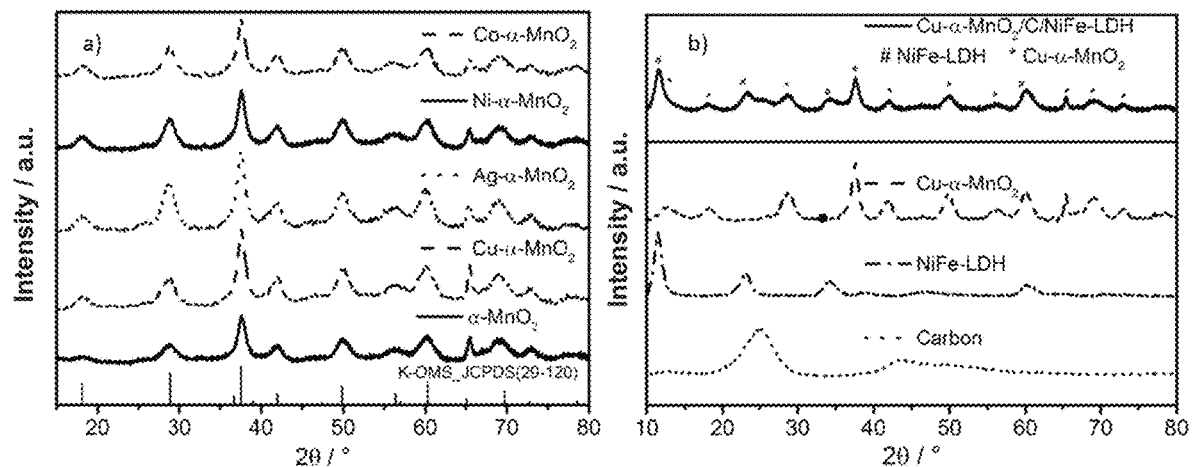
FIG. 1 shows (a) XRD diffractograms of alpha-manganese (IV) oxide doped with cobalt, nickel, copper or silver and of non-doped alpha-manganese (IV) oxide, and (b) XRD diffractograms of a carbon carrier material, of NiFe LDH, of Cu:α-MnO$_2$ and of a catalyst material according to the invention, comprising all of said components.

FIG. 1 shows a) XRD diffractograms of undoped cryptomelane manganese oxide (α-MnO$_2$) and of doped manganese oxide of the cryptomelane type (M:α-MnO$_2$, M=Cu, Ni, Ag, Co). The crystal structure of the resulting manganese oxide is not affected by the metal doping. It can thus be concluded that the amount of dopants can be dramatically increased by the synthesis used. Part b) of FIG. 1 shows XRD diffractograms of the individual components of the three-component system and of a complete three-component system according to the invention.

Figure 2:
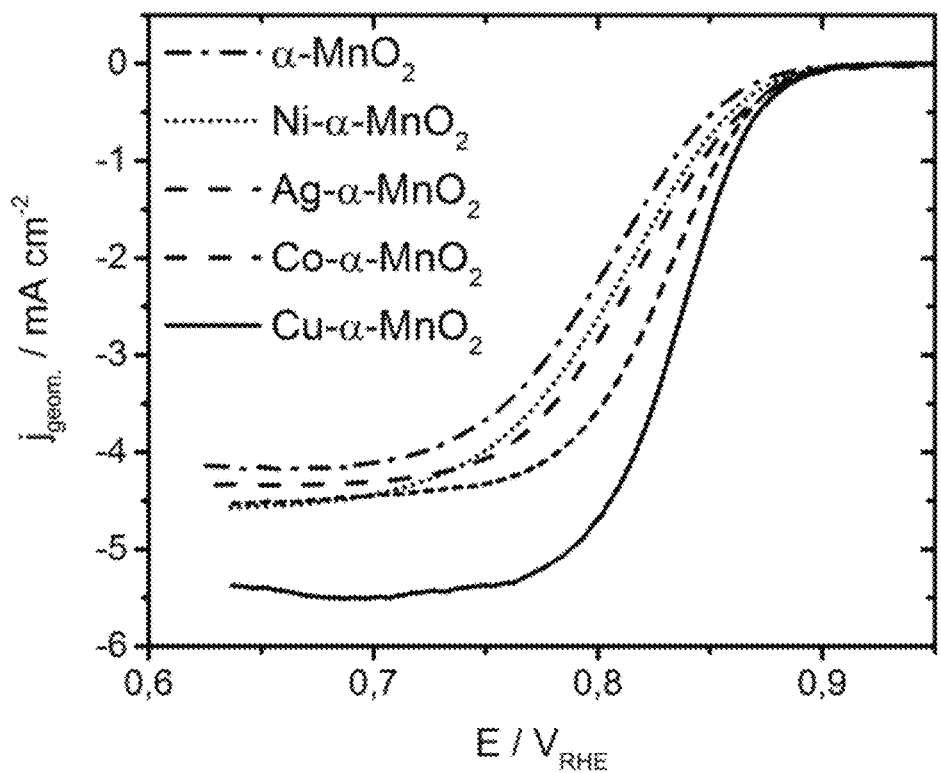
FIG. 2 shows a graphical comparison of electrochemical RDE measurements of alpha-manganese (IV) oxide doped with cobalt, nickel, copper or silver.

FIG. 2 shows results of electrochemical RDE measurements in oxygen-saturated 0.1-M KOH at 5 mV s$^{-1}$, 1600 rpm and a catalyst load of 203.72 µg cm$^{-2}$. The figure shows the ORR activities of various doped manganese oxides of the cryptomelane type (M:α-MnO$_2$, M=Cu, Ni, Ag, Co). As shown in FIG. 2, Cu:α-MnO$_2$ has the most positive potential at −3 mA cm$^{-2}$ and the highest diffusion limit currents. Therefore, Cu:α-MnO$_2$ can be regarded as the most active material among the materials investigated here and is used for further measurement of the catalyst according to the invention.

FIG. 3 shows two diagrams which represent a) ORR activities and b) OER activities of NiFe-LDH, Pt/C-Ir/C, Cu:α-MnO$_2$/carbon and physically mixed Cu:α-MnO$_2$/carbon/NiFe LDH. It can be seen from the graphs that the transition metal oxide-based system according to the invention surpasses the commercial catalyst used as a reference with respect to ORR activity and OER activity. The ORR activity of the manganese oxide is only slightly influenced by the addition of NiFe LDH, while the OER activity is dramatically increased.

Figure 4A:
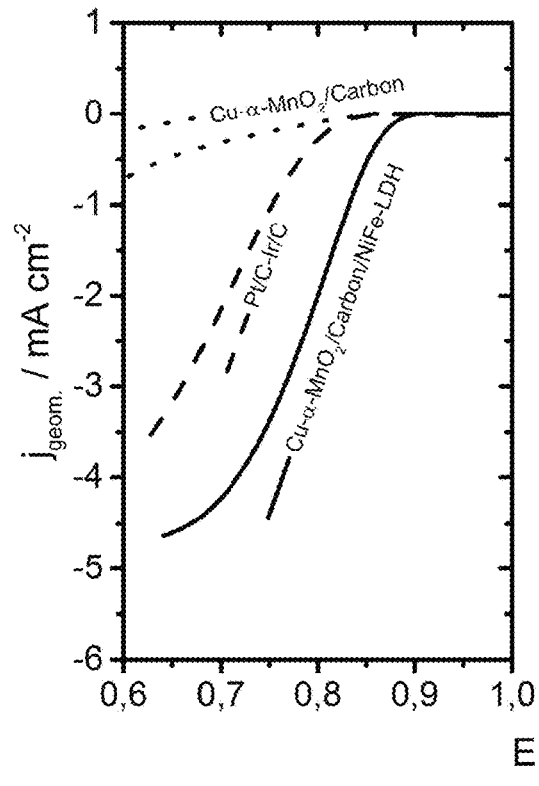
FIG. 4 shows a graphical representation of cyclic voltammograms of the materials from FIG. 3 after electrochemical loading, a) being ORR activity, b) being OER activity.
Figure 4B:
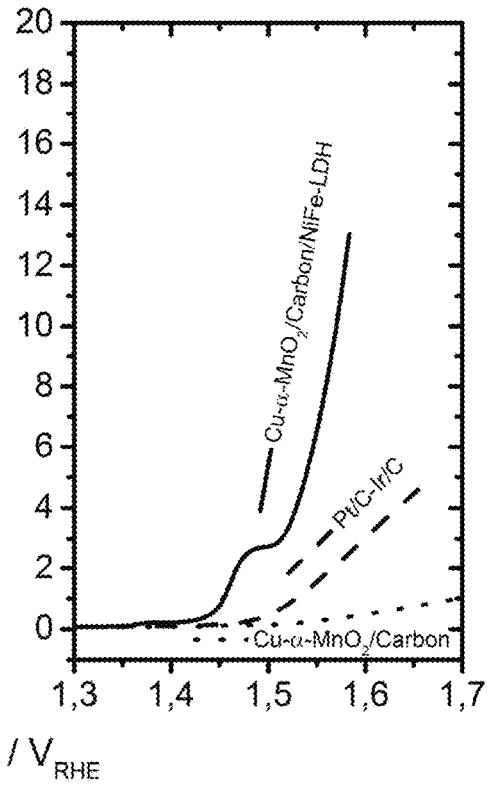

FIG. 4 shows a) ORR and b) OER activities of Cu:α-MnO$_2$/carbon, commercial Pt/C-Ir/C and Cu:α-MnO$_2$/carbon/NiFe LDH after electrochemical loading. The stability of the transition metal catalyst surpasses the stability of the commercial precious metal reference catalyst. In addition, a simple comparison shows that NiFe LDH considerably improves the stability of the three-component catalyst according to the invention. While the activity of NiFe LDH-free Cu:α-MnO$_2$/carbon decreases dramatically, the activity of the NiFe LDH-containing system is less strongly influenced. Therefore, a shielding effect of NiFe LDH is assumed.

Figure 5:
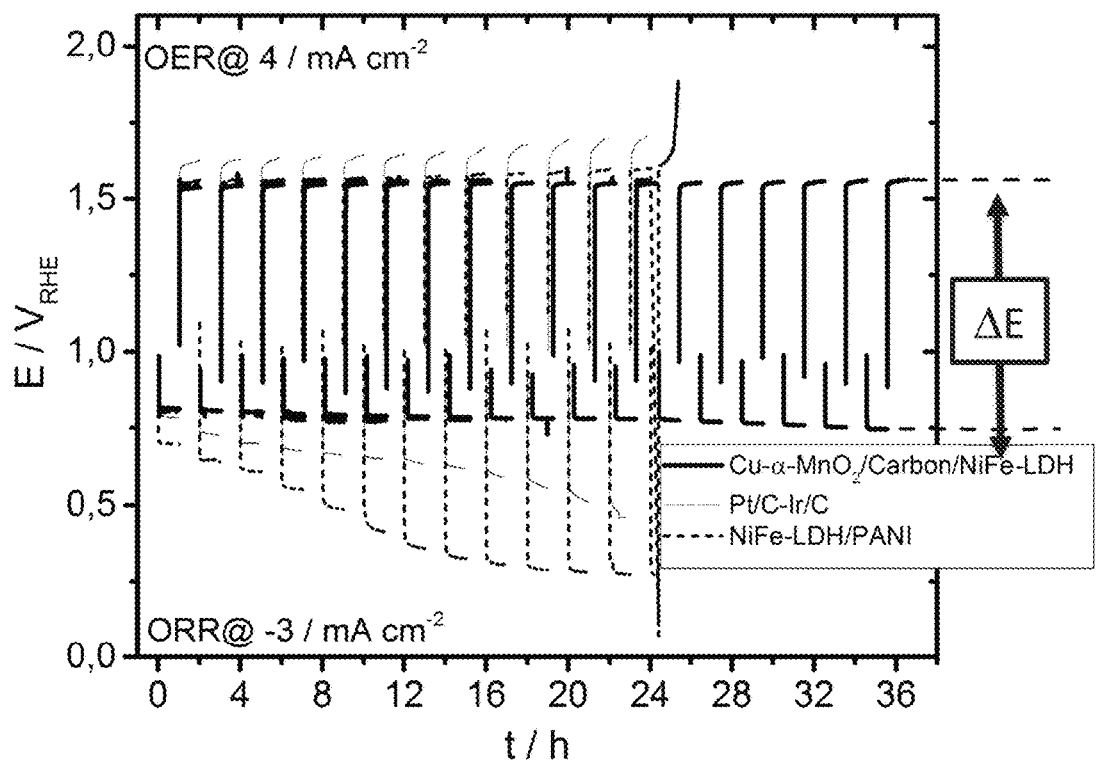
FIG. 5 shows a graphical representation of a galvanostatic stability test of Cu:α-MnO$_2$/carbon/NiFe LDH on a rotating disk electrode.

FIG. 5 shows a graphical representation of galvanostatic stability measurements on a rotating disk electrode in an oxygen-saturated 0.1-M KOH solution of the Cu:α-MnO$_2$/carbon/NiFe LDH, a commercial reference catalyst and a transition metal-based comparison system (data of NiFe LDH/PANI from reference). The current was kept constant at −3 mA cm$^{-2}$ for the oxygen reduction reaction and constant at 4 mA cm$^{-2}$ for the oxygen evolution reaction. In contrast to the transition metal-based comparison system and the precious metal-based reference catalyst, the total activity remains stable over more than 18 alternating OER and ORR potential cycles.

Figure 6:
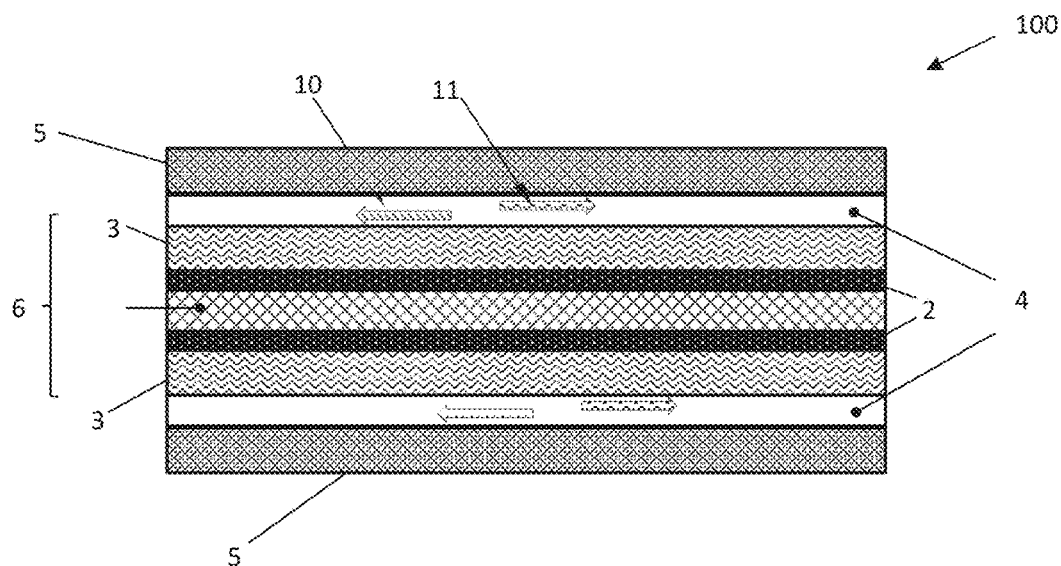
FIG. 6 shows a schematic sectional view of a unitised regenerative fuel cell (URFC) in a preferred embodiment of the invention.

A schematic sectional view of an individual cell of a PEM fuel cell, labelled as a whole by 100, is shown in FIG. 6 to explain the structure and its operating principle.

The fuel cell 100 comprises, as a core component, a membrane electrode assembly 6, which in the present case preferably has an ion exchange membrane 1, and in each case one electrode 2, specifically an anode and a cathode, adjoining one of the two flat sides of the membrane 1. The ion exchange membrane 1 can be a polymer electrolyte membrane, preferably an anion exchange membrane, for example Tokuyama A201, Selemion, Fumasep, which (selectively) permits ion diffusion from the anode chamber into the cathode chamber or vice versa. The electrodes 2 comprise a catalytic material that can be supported on an electrically conductive material, for example a carbon-based material.

The electrodes 2 are each adjoined by a gas diffusion layer 3, the task of which is substantially to uniformly distribute the supplied operating gases over the main surfaces of the electrodes 2, or of the membrane 1.

A bipolar plate 5 is arranged on the outer sides of each gas diffusion layer 3. Bipolar plates have the task of electrically interconnecting the individual membrane electrode assemblies 6 of the individual cells in the stack, cooling the fuel cell stack and supplying the operating gases to the electrodes 2. For the latter purpose, the bipolar plates 5 (also called flow field plates) have flow fields 4. The flow fields 4 comprise, for example, a plurality of flow channels which are arranged parallel to one another and which are incorporated in the form of grooves or slots in the plates 5. Usually, each bipolar plate has, on its one side, an anode flow field facing the anode 2 and, on its other side, a cathode flow field facing the cathode. In the present case, only one flow field 4 is depicted for each of the two bipolar plates 5 shown.

During operation as a fuel cell, a fuel, in particular hydrogen ($H_2$), is supplied to the anode flow field, while an operating medium, in particular air, containing oxygen (O2) is supplied to the cathode flow field.

During operation as a reversible fuel cell, the function of the flow fields changes; the anode field is changed to the cathode field and vice versa. Therefore, it is more expedient to refer to the electrodes as the oxygen electrode and the hydrogen electrode. In this case, the reactions involving oxygen, i.e. the oxygen reduction and the oxygen evolution reaction, take place at the oxygen electrode. Conversely, the hydrogen evolution reaction and the hydrogen oxidation reaction take place at the hydrogen electrode.

Since the reactions taking place at the hydrogen electrode are less complex and easier to catalyse, the catalyst material according to the invention is preferably arranged on the oxygen electrode.

The reactions taking place at the electrodes are not shown in FIG. 1. The electrodes catalysed at the surface of the respective electrodes release ions, which then migrate through the membrane 1. In the case of a fuel cell reaction, this means that a catalytic reduction of oxygen $O_2$ into hydroxide ions $OH^-$ takes place at the oxygen electrode by receiving electrons. The hydroxide ions migrate through the anion-conducting membrane 1 and reach the hydrogen electrode. The hydrogen $H_2$ supplied reacts with the hydroxide ions $OH^-$ to form water $H_2O$, with the hydrogen being oxidised and thus donating electrons. The electrons of the hydrogen electrode reaction are supplied to the oxygen electrodes via an external circuit (not shown here). It can be seen from FIG. 1 that the product water of the fuel cell 100 arises on the oxygen electrode side of the membrane 5.

The catalytically coated substrate, which acts as an electrode, comprises a substrate and a catalyst layer applied thereto according to the present invention. The catalyst layer can function as an oxygen electrode in a fuel cell. The substrate may be a membrane or a gas diffusion layer. In the embodiment shown here, the substrate is a membrane. The membrane can in principle be any ion exchange membrane used in fuel cell technology. These include, for example, polymer electrolyte membranes which have an electrolytic conductivity based on their wetting with water (e.g. Nafion®), or which owe their conductivity to an acid bonded to the polymer material or, in the case of anion exchange membrane, to its quaternary amine, for example polysulfone doped with trimethylammonium, so that quaternary benzyltrimethylammonium groups are produced.

The catalyst layer is composed at least of a catalyst material which is arranged on a carrier material. It may further comprise a solvent, an electrolyte and/or an electron conductor.

The carrier material functions as an electron conductor. In general, the electron conductor is in the form of electrically conductive carbon particles. All carbon materials which are known in the field of fuel or electrolysis cells and have a high degree of electrical conductivity and a large surface area can be used as electrically conductive carbon particles. The surface is, for example, 50 to 200 $m^2/g$. Preferably, carbon blacks, graphite or activated carbons are used. Carbon blacks of high conductivity, so-called conductive carbon blacks, are very particularly preferred. In addition, carbon can also be used in other modifications, for example in granular form or as so-called nanotubes.

The preferred embodiment of the catalyst material according to the invention provides a novel catalyst system which can be used as a bifunctional oxygen electrode in unitised regenerative fuel cells (URFC) and metal-air batteries. The catalyst system comprises a physical mixture of a separately synthesised NiFe layer double hydroxide (NiFe LDH), M-doped alpha-$MnO_2$ (M:α-$MnO_2$) and an additional carbon carrier.

In particular, M:α-$MnO_2$ (M=nickel, copper, silver or cobalt) is the component that acts catalytically for ORR. The proportion (weight basis) of the dopant in M:α-MnO2 is preferably 0.2 wt %, up to 2.2 wt %. α-$MnO_2$ crystallises in the cryptomelane structure, which is not affected by the dopants, as shown in FIG. 1. The carrier material used is preferably commercially available carbon black, for example Vulcan XC-72R@.

The component which is active for oxidising water is an intercalation compound, preferably NiFe LDH. The molar ratio between nickel and iron is between 5:1 to 3:1. In order to obtain the electrocatalyst which is capable of catalysing said reactions, the various components are physically mixed using sonication. To this end, a suspension is produced which contains both electrocatalysts, the carrier material, high-purity water (obtained, for example, by means of Mili-Q), isopropanol and the binder. In the case of slow application to a substrate, the ratio (weight basis) between Mili-Q, isopropanol and the binder is preferably 76.8 wt %: 20.0 wt %: 3.2 wt %. The total concentration of the solids may be in the range of 3.5 mg $L^{-1}$ to 5 mg $L^{-1}$. In the case of rapid application, water and isopropanol are preferably present at 2 wt % and 98 wt % respectively. Solids and binders are then preferably present in the solvent mixture in a ratio of 7:3. The total mass of the solid can be in a range from 15000 mg $L^{-1}$ to 22000 mg $L^{-1}$. The binder used is a perfluorinated sulfonic acid polymer such as Nafion® or polysulfone containing quaternary benzyltrimethylammonium groups.

α-$MnO_2$ alone is not a sufficiently active and stable catalyst for the ORR. The application of α-$MnO_2$ to carbon, in particular Vulcan XC-72R and the doping of α-$MnO_2$, in particular with copper, provide a material which is a competitive ORR catalyst. NiFe LDH is a very active and stable OER catalyst. Other materials based on transition metals capable of catalysing OER with the same activity as NiFe LDH are nickel- or vanadium-doped cobalt ferrites ($Co_x(Ni/V)_3Fe_2O_4$). The present electrocatalyst provides several advantages over other bifunctional systems. It is a very cost-efficient system, compared to electrocatalysts based on precious metals such as Pt/C-Ir/C, which achieve similar OER and ORR activities. Compared to other ORR catalysts based on transition metals and carbon materials, the synthesis of the ORR-active component is simple, fast, energy-efficient and easily scalable. The greatest advantage of the three-component system presented here is the extraordinary stability. Whereas the activity of systems such as NiFe LDH/PANI or Pt/C-Ir/C decreases significantly during sustained electrochemical loading, the activity of the catalyst material according to the invention remains intact despite the carbon component (FIG. 4).

The mixture of M:α-$MnO_2$, NiFe LDH and carrier material in the preferred composition provides an inexpensive and competitive electrocatalyst which is simultaneously active for OER and ORR. While the electrochemical splitting of water is catalysed by NiFe LDH, the oxygen reduction is catalysed by the carbon-supported M:α-MnO$_2$. The above-mentioned components are respectively active only for OER or ORR, but not for both reactions.

In the following, examples are provided to illustrate the catalyst material according to the invention.

EXAMPLE 1: PRODUCTION OF M:α-MNO$_2$: M=CO, CU, AG, NI, COCU

α-MnO$_2$ was synthesised using a top-down approach described by Ding et. al. (Y. Ding, X. Shen, S. Gomez, R. Kumar, V. M. B. Crisostomo, S. L. Suib and M. Aindow, *Chem. Mater.*, 2005, 17, 5382-5389). To determine the optimum dopant for α-MnO$_2$, small amounts of cobalt, copper, silver, nickel and a mixture of cobalt and copper were added to the above synthesis and then tested with respect to ORR activity. The proportion of the dopant obtained was between 0.2 wt % (silver) and 2.25 wt % (copper plus cobalt). The crystal structure of the catalyst is not affected by the various dopants (FIG. 1a).

EXAMPLE 2: PRODUCTION OF NIFE LDH

The second component, NiFe LDH, was produced using a microwave-assisted synthesis, a mixture of Fe(NO)$_3$×9 H$_2$O and Ni(OAc)$_2$×4 H$_2$O being dissolved in DMF/H$_2$O and converted according to a procedure by Dresp et. al (S. Dresp, F. Luo, R. Schmack, S. Kühl, M. Gliech and P. Strasser, *Energy Environ. Sc.*, 2016, 9, 2020-2024). The XRD diffractogram is shown in FIG. 1b.

EXAMPLE 3: ORR ACTIVITY OF M:α-MNO$_2$: M=CO, CU, AG, NI

To determine the ORR and OER activities of the undoped and doped manganese oxides from Example 1, a three-electrode RDE setup was used with a platinum gauze as a counter-electrode, a reversible hydrogen electrode (RHE) as a reference electrode and a glass-like carbon disk coated with the catalyst as a working electrode. As shown in FIG. 2, the copper-doped manganese oxide (Cu:α-MnO$_2$) is the most active catalyst material with respect to ORR in this series.

EXAMPLE 4: ORR AND OER ACTIVITY OF CU:α-MNO$_2$/CARBON/NIFE LDH

Figure 3A:
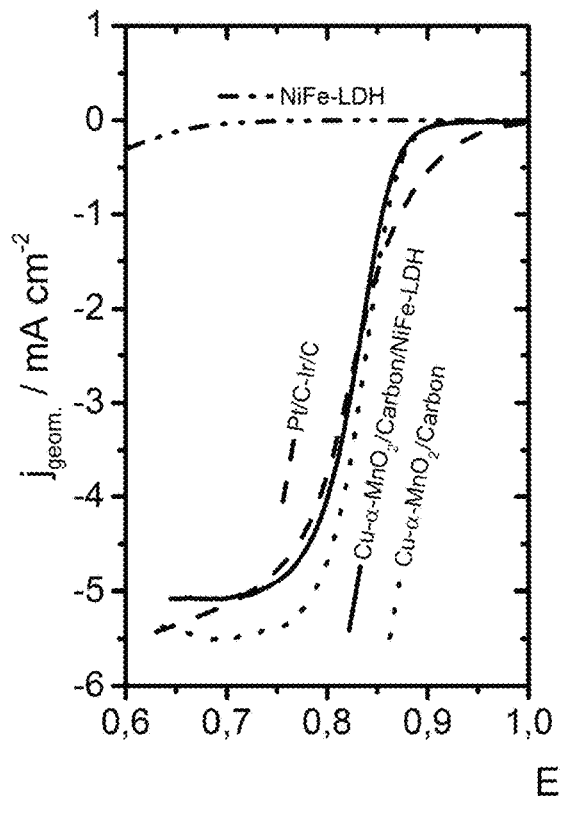
FIG. 3 shows a graphical representation of cyclic voltammograms of a catalyst material Cu:α-MnO$_2$/carbon/NiFe LDH according to the invention compared with the individual components Cu:α-MnO$_2$/carbon and NiFe LDH and a precious metal-based reference catalyst Pt/C-Ir/C, a) being ORR activity and b) being OER activity.
Figure 3B:
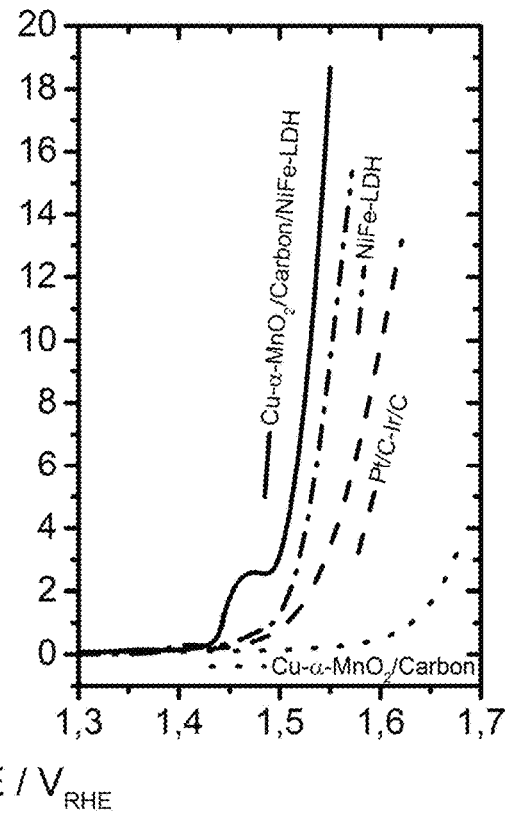

A three-component catalyst was produced using the Cu:α-MnO$_2$ of example 1 and the NiFe LDH of Example 2 on an unmodified carbon carrier material (Vulcan XC-72R) in a ratio of 1:1:1 to 3:1:3. To determine the ORR and OER activities of the catalyst, the three-electrode RDE setup was used as in Example 3. For comparison, the corresponding activities of the individual components Cu:α-MnO$_2$ and NiFe LDH and of a commercial Pt/C-Ir/C catalyst from the prior art were measured. FIGS. 3a and 3b show the electrochemical activities with respect to ORR and OER respectively. The potential difference between −3 mA cm$^{-2}$ (ORR) and 10 mA cm$^{-2}$ results in a total excess potential of 0.7086 V±0.0011 V. FIG. 4 shows the ORR and OER activities of these materials after electrochemical loading.

EXAMPLE 5: LONG-TERM STABILITY OF CU:α-MNO$_2$/CARBON/NIFE LDH

The most important achievement of the catalyst material according to the invention is its long-term stability, which was likewise evaluated in a three-electrode RDE measurement setup for the catalyst according to Example 4. The galvanostatic measurement was carried out at a constant current density of 4 mA cm$^{-2}$ for OER and −3 mA cm$^{-2}$ for ORR. Current density relevant between ORR and ORR was changed hourly. The results of the stability testing are shown in FIG. 5.

EXAMPLE 6: PRODUCTION OF CHLORIDE- AND PERCHLORATE-MODIFIED NIFE LDH- (CL$^-$/CLO$_4^-$)

Chloride- and perchlorate-modified NiFe LDH was produced as described in Song et al. (Song, F., et al., Exfoliation of layered double hydroxides for enhanced oxygen evolution catalysis. *Nature Communications* 2014, 5 (1)).

For the chloride exchange, 100 mg of the NiFe intercalation compound were dispersed in 100 ml of a saturated NaCl solution, which is mixed with 100 ml of a 0.01-M hydrochloric acid solution (HCl). The resulting reaction solution was stirred at 600 rpm for 24 hours at room temperature (RT). The product (chloride-NiFe intercalation compound; NiFe LDH-Cl$^-$) was separated from the dispersion by centrifugation, washed with water and finally freeze-dried.

The perchlorate exchange was carried out with the NiFe intercalation compound resulting from the chloride exchange. For this purpose, 100 mg of the starting material were dispersed in 100 ml of a saturated NaClO4 solution and 100 ml of a 0.01-M HCl solution were added. The reaction solution was stirred at 600 rpm for 24 hours at RT. The product (perchlorate-NiFe intercalation compound; NiFe LDH-ClO$_4^-$) was separated from the dispersion by centrifugation, washed with water and finally freeze-dried.

EXAMPLE 7: PRODUCTION OF N- AND N/P-MODIFIED CARBON CARRIER MATERIALS

The modifications of the carbon-containing carrier materials were carried out on the basis of the above-mentioned procedures from the literature using Vulcan XC-72R and multi-walled carbon nanotubes (MWCNTs).

The corresponding carbon-containing carrier material (MWCNT) was washed in a first step by means of concentrated hydrochloric acid. The second step was an oxygen modification of the materials. For this purpose, 100 ml of nitric acid (HNO$_3$) were used per gram of carbon-containing carrier material. The resulting reaction solution was refluxed for 2 to 6 hours at 90° C. with stirring. The product was separated from the reaction solution by centrifugation, washed with ultrapure water until the supernatant had a neutral pH and finally dried by lyophilisation.

The oxygen-modified carbon-containing carrier materials (OC) were subsequently modified by nitrogen and/or phosphorus. In order to carry out pure nitrogen modification, the OC were reacted with NH$_3$ in an ammonolysis reaction at 400 to 800° C. for 2 to 5 hours. Nitrogen and phosphorus were incorporated by thermal treatment of the OC at 500 to 800° C. for 2 to 5 hours in the presence of a nitrogen- and phosphorus-containing precursor.

EXAMPLE 8: PRODUCTION OF NIFE LDH

NiFe LDH, which is applied during synthesis to the carbon-containing carrier materials described in Example 7, was produced as described in Dresp et al. (S. Dresp, F. Luo, R. Schmack, S. Kühl, M. Gliech and P. Strasser, *Energy Environ. c.*, 2016, 9, 2020-2024). For this purpose, a carbon-containing carrier material or the carbon-containing carrier material from Example 7 was dispersed in DMF, and then the metal precursors from example 2, Fe(NO)$_3$×9 H$_2$O und Ni(OAc)$_2$×4 H$_2$O, were added. The subsequent synthesis was carried out as described in Example 2. The resulting catalyst material can be further modified by the chloride and perchlorate anion exchange specified in Example 6.

EXAMPLE 9: ORR ACTIVITY AND OER ACTIVITY OF CU:α-MNO$_2$/MOD. CARBON/NIFE LDH-(CL$^-$/CLO$_4^-$)

Using a modified NiFe intercalation compound from Example 6 or Example 8, the oxygen, nitrogen, nitrogen- or phosphorus-modified carbon carrier material from Example 7 and the Cu:α-MnO$_2$ from example 3, a modified three-component catalyst Cu:α-MnO$_2$/mod. carbon/NiFe LDH-(Cl$^-$/ClO$_4^-$) according to the invention was produced and, as described in Example 4, the ORR and OER activities were measured. FIGS. 7a and 7b show the electrochemical activities of the modified catalyst (modified material) compared with the unmodified catalyst Cu:α-MnO$_2$/carbon/NiFe LDH (primary material) with respect to ORR or OER. It can be seen that the electrocatalytic stability of the catalyst material is further improved by the modifications.

FIG. 8 shows the electrocatalytic ORR and OER activities (black and white bars) as well as the total activity (hatched bars) of the modified catalyst Cu:α-MnO$_2$/mod. carbon/NiFe LDH-(Cl$^-$/ClO$_4^-$) (modified material) and of the unmodified catalyst Cu:α-MnO$_2$/carbon/NiFe LDH (primary material) compared with other bifunctional ORR/OER catalyst systems known from the literature. The characterisation was carried out in each case on the basis of the excess potential for providing −3 mA cm$^{-2}$ (ORR) and 10 mA cm$^{-2}$ (OER).

EXAMPLE 10: ORR ACTIVITY AND OER ACTIVITY OF CU:α-MNO$_2$/MOD. CARBON/NIFE LDH-(CL$^-$/CLO$_4^-$)

Figure 9A:
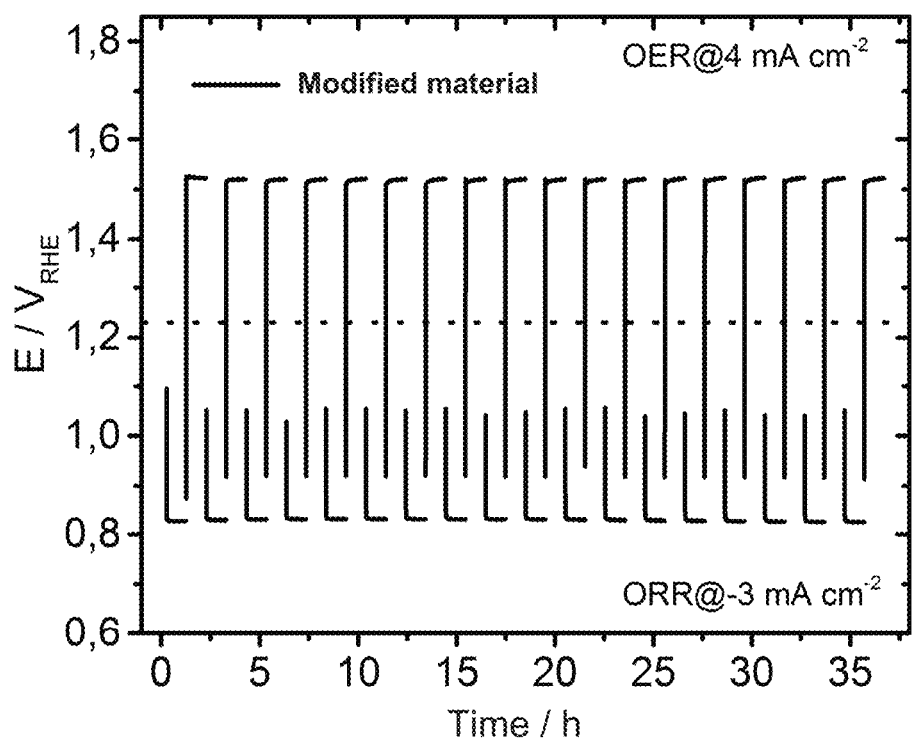
Figure 9B:
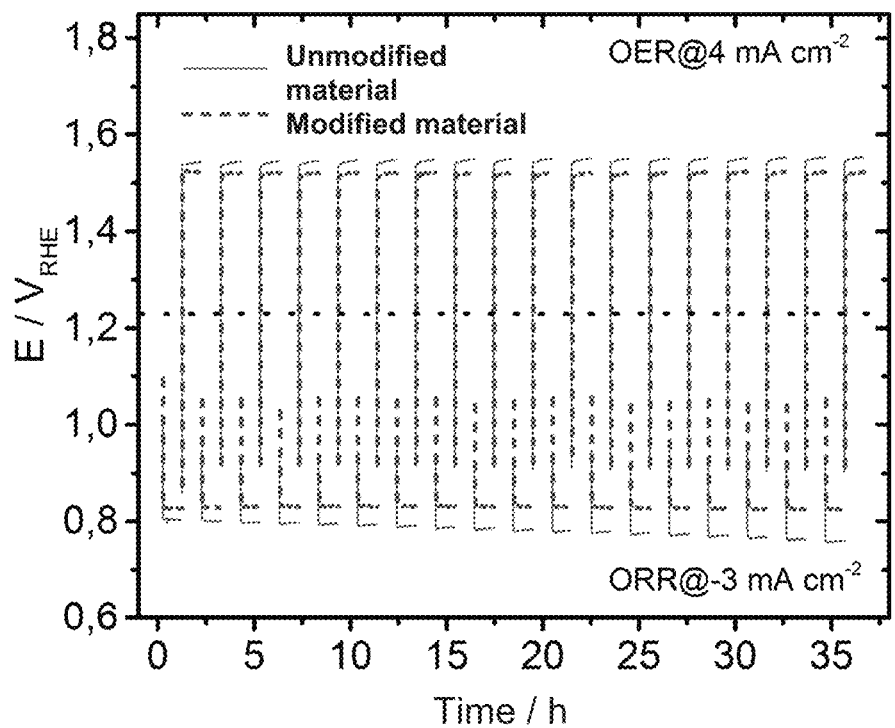

The electrocatalytic long-term stability of the modified catalyst Cu:α-MnO$_2$/mod. carbon/NiFe LDH-(Cl$^-$/ClO$_4^-$) from Example 9 was measured as described in Example 5. The result is shown in FIG. 9a, and FIG. 9b illustrates the result of the same measurement compared with the unmodified catalyst.

LIST OF REFERENCE NUMERALS

100 Combined fuel cell
1 Membrane
2 Electrode
3 Gas diffusion layer—GDL
4 Flow field
5 Bipolar plate—BPP
6 Membrane electrode assembly—MEA
10 Operation flow direction of fuel cell
11 Operation flow direction of reversible fuel cell

The invention claimed is:

1. A catalyst material for a fuel cell or an electrolyser, comprising a multi-component system including
   a manganese oxide doped with a dopant M,
   a NiFe intercalation compound, and
   a conductive carbon-containing carrier material on which the doped manganese oxide and the NiFe intercalation compound are directly or indirectly arranged.

2. The catalyst material according to claim 1, wherein the doped manganese oxide is a cryptomelane-type manganese dioxide according to the formula M:α-MnO$_2$.

3. The catalyst material according to claim 1, wherein the dopant M is selected from the group of iron, nickel, copper, silver and/or cobalt.

4. The catalyst material according to claim 1, wherein the dopant M is contained in the manganese oxide in a proportion in the range from 0.1 to 3.5 wt %, in particular in the range from 0.2 to 3.35 wt %.

5. The catalyst material according to claim 1, wherein the NiFe intercalation compound is a NiFe LDH, which in particular has 1.5 to 5 times the proportion by weight of nickel in relation to iron.

6. The catalyst material according to claim 1, wherein the NiFe intercalation compound is a NiFe intercalation compound modified by anion exchange.

7. The catalyst material according to claim 1, wherein the conductive carbon-containing carrier material is selected from carbon black, graphene, nanostructured carbon, carbon nanotubes and/or a carbonised carrier particle.

8. The catalyst material according to claim 1, wherein the conductive carbon-containing carrier material is modified by oxygen, nitrogen and/or phosphorus.

9. The catalyst material according to claim 1, wherein the NiFe intercalation compound is grown directly on the conductive carbon-containing carrier material.

10. An electrode, in particular an oxygen electrode, for a fuel cell or an electrolyser, including a catalyst material according to claim 1.

11. A fuel cell, an electrolyser, a regenerative fuel cell or a reversible electrolyser including an ion exchange membrane which is coated at least on one side with a catalyst material according to claim 1.

12. A method for producing a catalyst material according to claim 1, comprising the following steps in the specified order:
   preparing a mixture of a doped manganese oxide, a NiFe intercalation compound and a conductive carbon-containing carrier material by means of blending,
   preparing a catalyst dispersion from the mixture by adding water, an organic solvent and optionally a binder, and
   applying the catalyst dispersion to a substrate.

13. The method according to claim 12, wherein there are 70 to 80 parts by weight of water, 15 to 25 parts by weight of the organic solvent and 2 to 5 parts by weight of the binder in relation to the sum of the components water, organic solvent and binder, or there are 0.5 to 5 parts by weight of water and 95 to 98.5 parts by weight of the organic solvent in relation to the sum of the components water and organic solvent, and the solids and the binder are present in a ratio from 5:3 to 7:3 in the mixture of water and the organic solvent.

14. The method according to claim 12, wherein the binder is a perfluorinated sulfonic acid polymer and/or a quaternary ammonium compound, in particular a doped polysulfone.

15. The method according to claim 12, wherein the substrate is a gas diffusion layer or a membrane, in particular an ion exchange membrane.

* * * * *